US 6,599,338 B2

(12) United States Patent
Oh et al.

(10) Patent No.: US 6,599,338 B2
(45) Date of Patent: Jul. 29, 2003

(54) GRILL ASSEMBLY OF A CYCLONE DUST COLLECTING APPARATUS FOR A VACUUM CLEANER

(75) Inventors: Jang-keun Oh, Gwangju (KR); Joo-suck Jung, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 0 days.

(21) Appl. No.: 10/082,639

(22) Filed: Feb. 25, 2002

(65) Prior Publication Data

US 2002/0178700 A1 Dec. 5, 2002

(30) Foreign Application Priority Data

Jun. 4, 2001 (KR) .......................................... 2001-31056

(51) Int. Cl.[7] ............................................... B01D 45/12
(52) U.S. Cl. ........................ 55/337; 55/413; 55/426; 55/459.1; 55/DIG. 3
(58) Field of Search ....................... 55/337, 413, 459.1, 55/DIG. 3, 426; 15/350, 353

(56) References Cited

FOREIGN PATENT DOCUMENTS

| GB | 2344778 | 12/1998 | |
|----|---------|---------|------|
| JP | 52046581 A | * 4/1977 | .................. 55/337 |
| WO | 0004816 | 2/2000 | |
| WO | 0108544 | 2/2001 | |

* cited by examiner

Primary Examiner—Robert Hopkins
(74) Attorney, Agent, or Firm—Ladas & Parry

(57) ABSTRACT

A grill assembly of a cyclone dust collecting apparatus for a vacuum cleaner capable of improving the capability of dust collecting of the vacuum cleaner by reducing the amount of the filth drawn into a vacuum generating device through a grill. The grill assembly, disposed at the upper part of the air discharging passage of a cyclone body that separates filth from a whirling air current by a centrifugal force for the whirling air current of the drawn air for preventing the filth from being drawn into the vacuum generating device of the vacuum cleaner, includes a grill body and a plurality of passages disposed therein. The extended line of the center line of the passages forms an acute angle with a stream line of the whirling air current.

6 Claims, 3 Drawing Sheets

GRILL ASSEMBLY OF A CYCLONE DUST COLLECTING APPARATUS FOR A VACUUM CLEANER

BACKGROUND OF THE INVENTION

1. Field of the Invention

The present invention relates to a cyclone dust collecting apparatus for a vacuum cleaner, and more particularly to a grill assembly of a cyclone dust collecting apparatus for a vacuum cleaner capable of preventing backflow of the filth like hair to a vacuum-generating device.

2. Description of the Related Art

FIG. 1 shows one example of a conventional cyclone dust collecting apparatus for a vacuum cleaner. According to FIG. 1, the conventional cyclone dust collecting apparatus 10 for a vacuum cleaner comprises a cyclone body 20, a filth-collecting portion 30, and a partition 40.

An air suction passage 21, connected with a brush assembly (not shown) of the vacuum cleaner, is disposed at an upper part of the cyclone body 20. The air, which is drawn through the air suction passage 21 forms a whirling air current as it is drawn to the tangential direction of the cyclone body 20.

An air discharging passage 22, connected with a vacuum-generating device (not shown) of the vacuum cleaner, is disposed at an upper center of the cyclone body 20. A grill 23 is disposed at an inlet of the air discharging passage 22 for preventing hair being drawn to the vacuum-generating device.

The conventional cyclone dust collecting apparatus 10 of a vacuum cleaner with the above construction draws the filth-laden air from the cleaning surface to the cyclone body 20 through the air suction passage 21 and the brush assembly when the vacuum-generating device is operated. The air drawn into the cyclone body 20 forms a whirling air current with the filth contained in the air collected in a filth collecting portion 30 by being separated by a centrifugal force of the whirling air current. The cleaned air flows to the vacuum generating device through the passage 24 of the grill 23 and the air discharging passage 22.

However, as shown, for the conventional cyclone dust collecting apparatus 10, the inlet of the air discharging passage 22, which transfers a suction force of the vacuum-generating device to the cyclone body 20, is formed very closely to the outlet of the air suction passage 21. Accordingly, a phenomenon occurs that some of the filth that is drawn into through the air suction passage 21, cannot form a whirling air current due to the suction force of the vacuum generating device at the inlet of the air discharging passage 22. Instead, the filth is directly discharged through the grill 23 and the air discharging passage 22 without forming whirling air current.

This phenomenon is aggravated at the upper part of the grill 23 that is affected by the pressure at the inlet of the air discharging passage 22 and close to the outlet of the air suction passage 21. Therefore, the dust collecting efficiency of the vacuum cleaner is decreased. Accordingly, there is a need for improvements in these type devices.

SUMMARY OF THE INVENTION

The present invention has been made to overcome the above-mentioned problems of the related art. Accordingly, the present invention now provides a grill assembly of a dust collecting apparatus for a vacuum cleaner capable of improving dust collecting efficiency of the vacuum cleaner. In this device, filth, which is drawn through an air suction passage of a cyclone body with the air, is prevented from discharging through a grill and an air discharging passage without forming a whirling air current.

This is accomplished by providing a grill assembly of a cyclone dust collecting apparatus for a vacuum cleaner, disposed at an upper part of an air discharging passage of a cyclone body that generates whirling air current from the air drawn thereinto. The grill assembly separates filth from the whirling air by a centrifugal force and prevents the filth from drawing into the vacuum generating device of the vacuum cleaner. This grill assembly advantageously comprises a grill body including a plurality of passages and an extension pipe having a diameter formed as the same with a diameter of the air discharging passage. The extension pipe is preferably disposed between an upper part and a lower part of the passage.

A filter can be formed in the extension pipe and, if so, can be disposed at the extension pipe for an upper part of the filter being protruded from the upper part of the extension part.

DETAILED DESCRIPTION OF THE PREFERRED EMBODIMENT

The preferred embodiment of the present invention will be described referring to the accompanying drawing figures.

Figure 1:
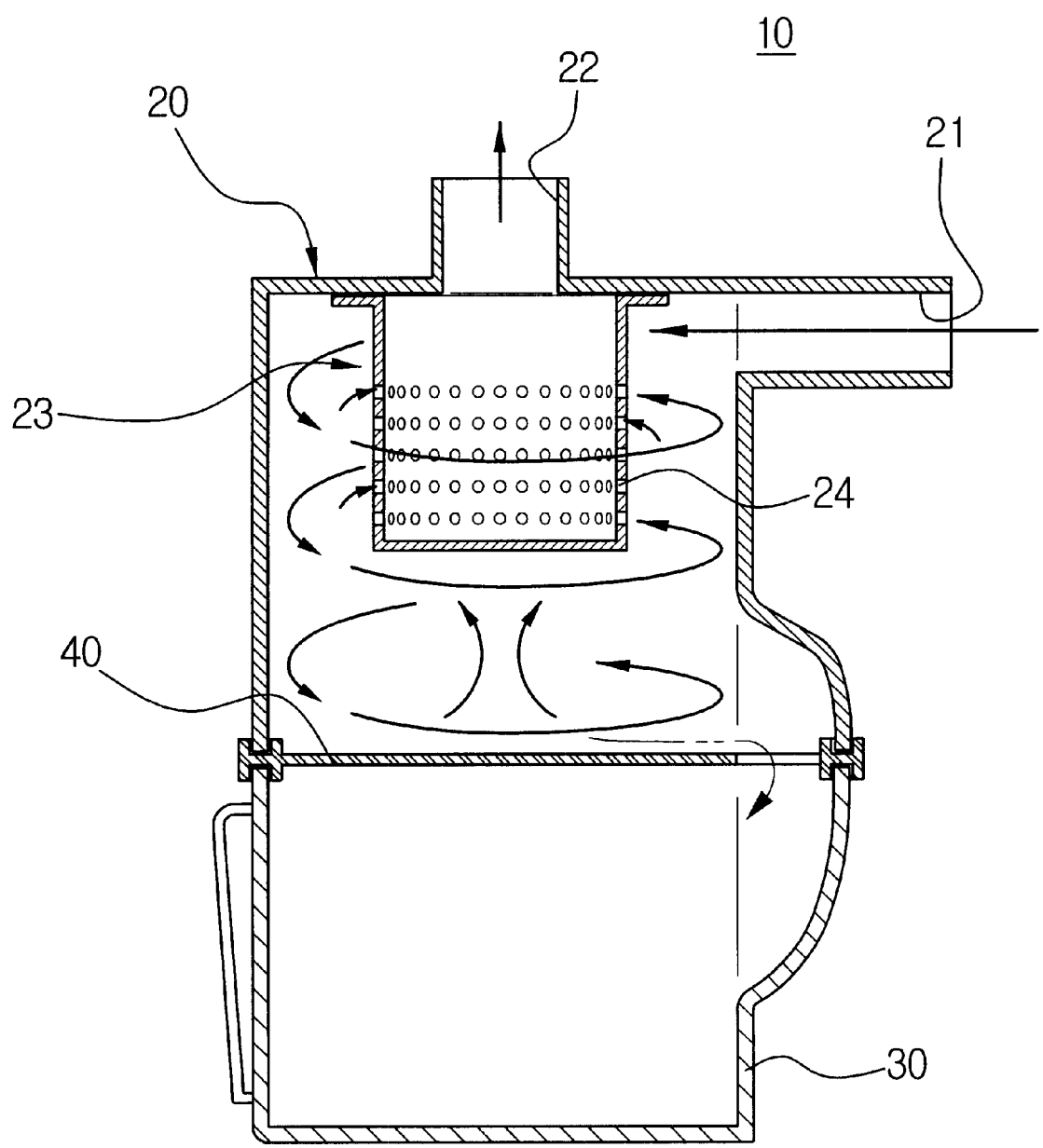
FIG. 1 is a sectional view showing a conventional cyclone dust collecting apparatus of a vacuum cleaner.
Figure 2:
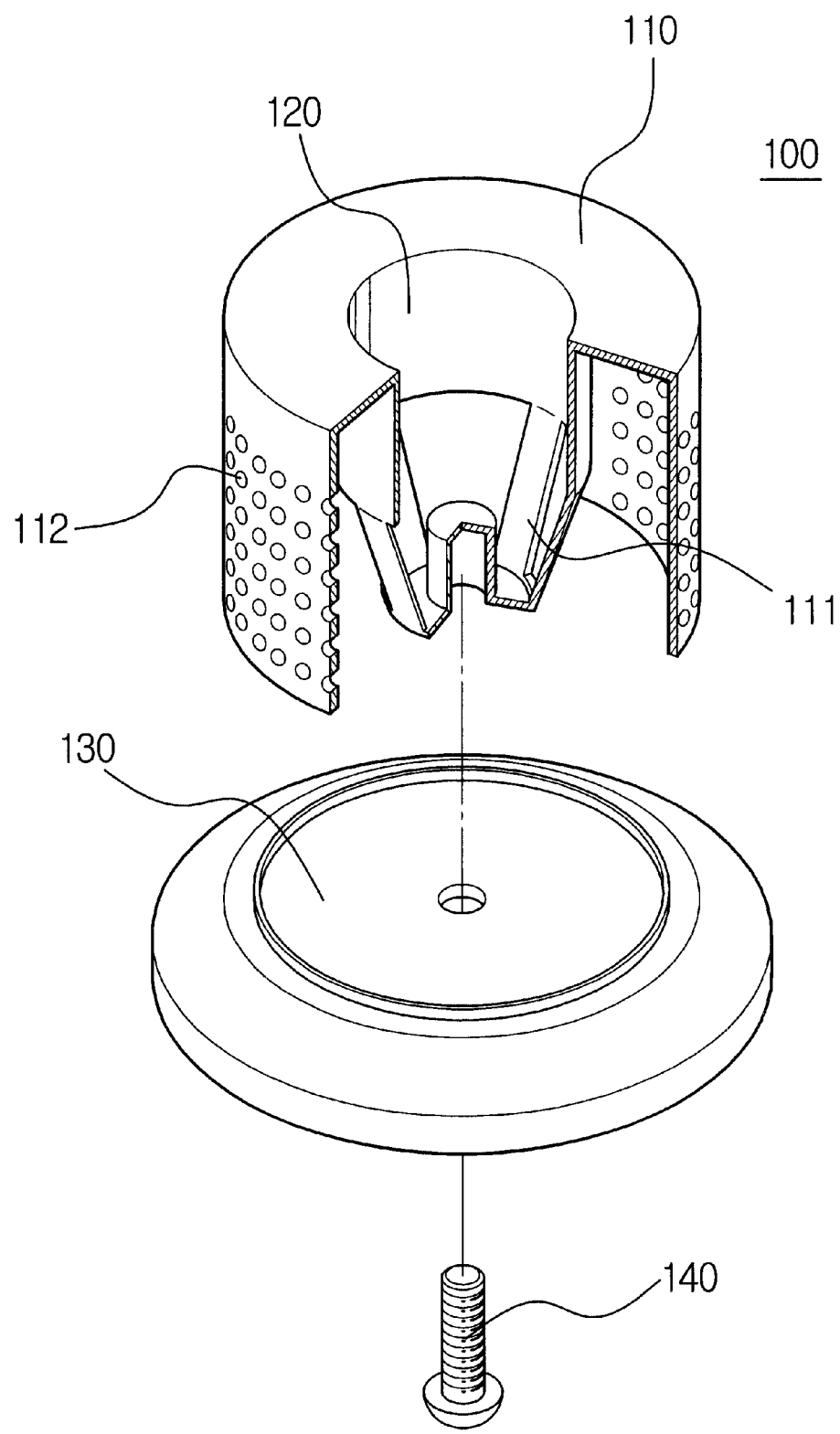
FIG. 2 is an exploded perspective view showing a grill assembly of the cyclone dust collecting apparatus for the vacuum cleaner according to the present invention.

FIG. 2 shows one example of a grill assembly of a cyclone dust collecting apparatus for a vacuum cleaner according to the present invention. According to the FIG. 1, the grill assembly 100 of the cyclone dust collecting apparatus for the vacuum cleaner of the present invention includes a grill body 110, an extension pipe 120, and a shielding member 130.

Figure 3:
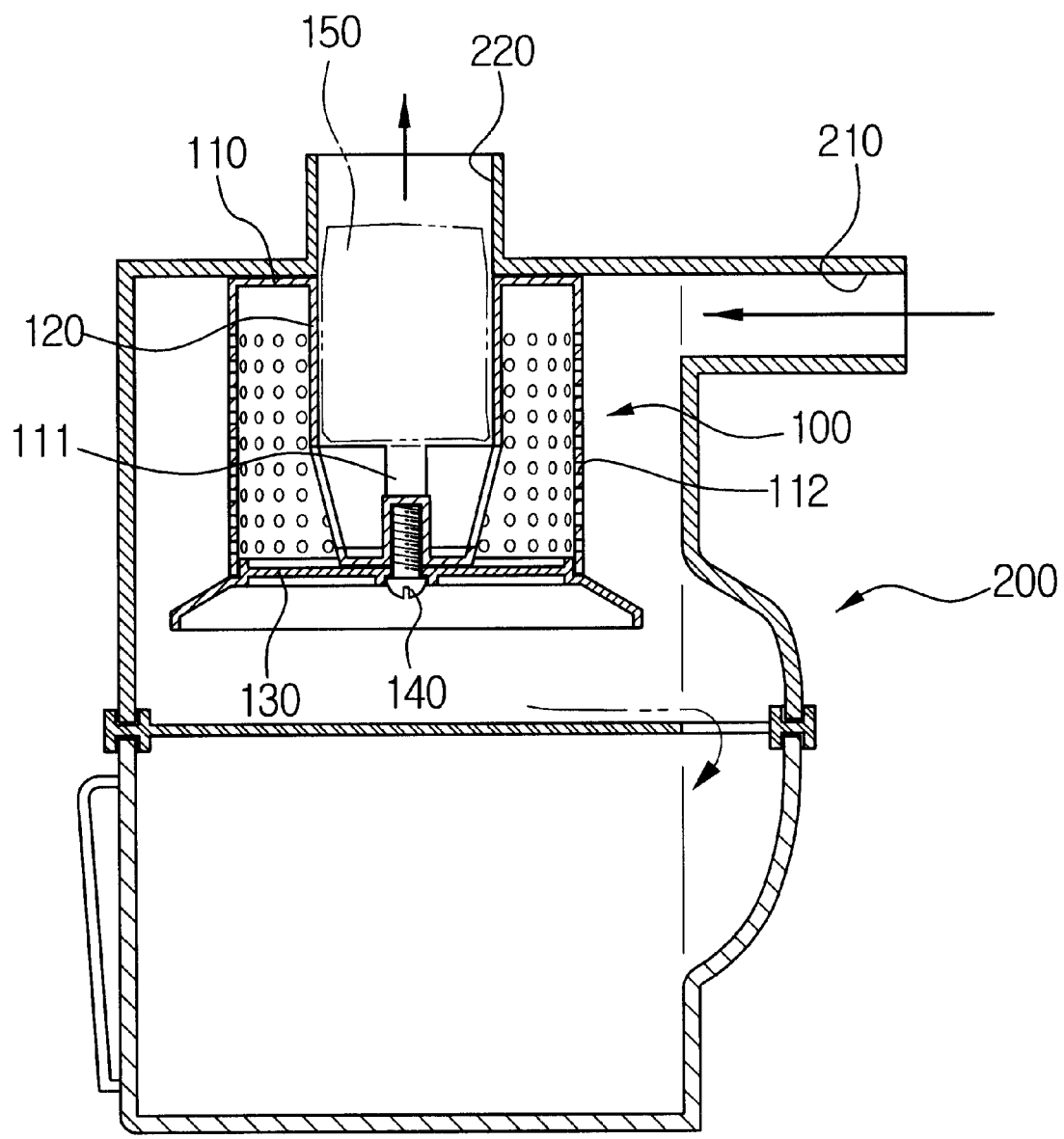
FIG. 3 is a sectional view showing the grill assembly of the cyclone dust collecting apparatus according to the present invention being constructed at the cyclone dust collecting apparatus at the vacuum cleaner.

A plurality of passages 112 are formed at the grill body 110, and as shown in FIG. 3, the inner diameter of the extension pipe 120 is the same as the diameter of an air discharging passage 220. Therefore, the air discharging passage 220 is extended as much as the length of the extension pipe 120.

Accordingly, as shown in FIG. 3, an inlet (an inlet of the extension pipe 120) of the air discharging passage 220 of a cyclone body 200 is formed farther away from the outlet of an air suction passage 210 than in the conventional cyclone dust collecting apparatus shown in FIG. 1. Therefore, the phenomenon that some filth, drawn into through the air suction passage 210, cannot form a whirling air current by a suction power of a vacuum generating device at the inlet of the air discharging passage 220 and is directly discharged through the passages 112 and the air discharging passage 220, is decreased.

A lower part of the extension pipe 120 is positioned in between an upper part and a lower part of the passages 112. In other words, the variation of the length between the lower part of the extension pipe 120 and the passage 112 is less than the variation of the length between the conventional air discharging passage 220 and the passage 24 shown in FIG. 1.

Thus, the variation of pressure difference between the air discharging passage 220 and the passage 24 is less than the conventional case. In other words, the suction of the filth through the upper part of the grill assembly 100 is decreased due to an even pressure distribution.

A filter 150 can be disposed in the extension pipe 120. Accordingly, the filth is not discharged through the air discharging passage 220 even if the filth is drawn into the grill assembly 100. The filter 150 also reduces the noise of the cyclone duct collecting apparatus. It is preferable that an upper part of the filter 150 protrude from an upper part of the extension pipe 120. The protruded part has the function of a handle for use in replacement of the filter 150.

A shielding member 130 shields a lower opening of the grill body 110. The shielding member 130 is connected with a bracket 111 integrally, formed with the grill body 110 by a screw 140. In other words, the shielding member 130 can be separated from the grill body 110 by unscrewing the screw 140, and thus the maintenance and repair of the grill assembly becomes easier.

FIG. 3 shows the grill assembly 100 with the above construction mounted on the cyclone body 200. The grill assembly 100 is removably attached at the cyclone body 200 by a connection member such as a screw (not shown). When the vacuum-generating device of the vacuum cleaner is operated, the air containing all kinds of filth existing on a cleaning surface is drawn into the cyclone body 200 through a brush assembly and the air suction passage 210. As describe above, however, according to the grill assembly 100 of the cyclone dust collecting apparatus for the vacuum cleaner of the present invention, the inlet (the inlet of the extension pipe 120) of the air discharging passage 220 is formed farther from the air suction pipe 210 than the conventional one. Therefore, the phenomenon, that some filth, drawn into through the air suction passage 210, cannot form a whirling air current due to the suction power of the vacuum-generating device at the inlet of the air discharging passage 220 and is directly discharged through the passage 112 and the air discharging passage 22 without forming whirling air current, is decreased.

Moreover, according to the grill assembly 100 of a cyclone dust collecting apparatus for a vacuum cleaner, the variation of the pressure difference between the air discharging passage 220 and the passage 112 is less than the conventional one. In other words, the suction of the filth through the upper part of the grill assembly 100 is reduced due to an even pressure distribution. The description of the rest of the operation of the cyclone dust collecting apparatus will be omitted since it is essentially the same as the conventional one.

As described above, according to the grill assembly 100 of the cyclone dust collecting apparatus of the vacuum cleaner, the amount of the filth discharged to the air discharging passage 220 without forming a whirling air current after being drawn into through the air suction passage 210 of the cyclone body 200, is reduced.

Although the preferred embodiment of the present invention has been described, it will be understood by those skilled in the art that the present invention should not be limited to the described preferred embodiment. Various changes and modifications can be made within the spirit and scope of the invention and it is intended that the appended claims cover all such modifications and changes.

What is claimed is:

1. A grill assembly of a cyclone dust collecting apparatus for a vacuum cleaner, disposed at an upper part of an air discharging passage of a cyclone body that generates whirling air current from the air drawn thereinto and separates filth from the whirling air by a centrifugal force, the grill assembly preventing the filth from drawing into a vacuum generating device of the vacuum cleaner, and comprising:

a grill body having an upper part and a lower parts that include a plurality of passages therein and a lower opening;

an extension pipe having an upper end, a lower end, and a diameter which is substantially the same as that of the air discharging passage, and the lower end of the extension pipe being positioned between the upper part and the lower part of the grill body; and a shielding member shielding the lower opening of the grill body.

2. The grill assembly of a cyclone dust collecting apparatus for a vacuum cleaner of claim 1, wherein the extension pipe includes a filter mounted therein.

3. The grill assembly of a cyclone dust collecting apparatus for a vacuum cleaner of claim 2, wherein the filter is disposed upon the extension pipe and protrudes from the upper part of the extension pipe.

4. A vacuum cleaner comprising a vacuum-generating device, a cyclone dust collecting apparatus, a grill assembly for the cyclone dust collecting apparatus, the grill assembly being disposed at an upper part of an air discharging passage of a cyclone body that generates whirling air current from the air drawn thereinto and separates filth from the whirling air by a centrifugal force, the grill assembly preventing the filth from drawing into a vacuum generating device of the vacuum cleaner, and comprising:

a grill body having an upper part and a lower parts that include a plurality of passages therein and a lower opening;

an extension pipe having an upper end, a lower end and a diameter which is substantially the same as that of air discharging passage, and the lower end of the extension pipe is positioned between the upper part and the lower part of the grill body; and a shielding member shielding the lower opening of the grill body.

5. The vacuum cleaner of claim 4, wherein the extension pipe includes a filter mounted therein.

6. The vacuum cleaner of claim 5, wherein the filter is disposed upon the extension pipe and protrudes from the upper part of the extension pipe.

* * * * *